US009738376B2

(12) United States Patent
Didey (10) Patent No.: US 9,738,376 B2
(45) Date of Patent: Aug. 22, 2017

(54) LANDING GEAR DRIVE SYSTEMS

(71) Applicant: AIRBUS OPERATIONS LIMITED, Bristol (GB)

(72) Inventor: Arnaud Didey, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 581 days.

(21) Appl. No.: 14/274,083

(22) Filed: May 9, 2014

(65) Prior Publication Data

US 2014/0245853 A1    Sep. 4, 2014

Related U.S. Application Data

(63) Continuation of application No. 14/353,105, filed as application No. PCT/GB2013/052061 on Aug. 1, 2013, now Pat. No. 9,469,397.

(30) Foreign Application Priority Data

Aug. 8, 2012 (GB) .................................. 1214198.2

(51) Int. Cl.
*B64C 25/34* (2006.01)
*B64C 25/40* (2006.01)
*F16H 1/06* (2006.01)

(52) U.S. Cl.
CPC ............ *B64C 25/34* (2013.01); *B64C 25/405* (2013.01); *F16H 1/06* (2013.01); *Y02T 50/823* (2013.01); *Y10T 74/19684* (2015.01)

(58) Field of Classification Search
CPC ....... B64C 25/34; B64C 25/40; B64C 25/405; F16H 1/06; F16H 1/20; F16H 1/24; Y10T 74/19684; Y02T 50/823
See application file for complete search history.

(56) References Cited

U.S. PATENT DOCUMENTS 3,397,589 A    8/1968   Moore
3,850,389 A *  11/1974  Dixon .................. B64C 25/405
                                                    244/103 S (Continued)

FOREIGN PATENT DOCUMENTS

CN    2044665 U    9/1989
CN    2378576 Y    5/2000

(Continued)

OTHER PUBLICATIONS

International Search Report mailed Oct. 30, 2013 in International Application No. PCT/GB2013/052064, filed Aug. 1, 2013.

(Continued)

*Primary Examiner* — Valentina Xavier
(74) *Attorney, Agent, or Firm* — Hauptman Ham, LLP (57) ABSTRACT

A drive system for rotating a wheel of an aircraft landing gear includes a motor operable to rotate a first drive pinion via a first drive path and a driven gear adapted to be fixed to the wheel. The drive system has a first configuration in which the first drive pinion is capable of meshing with the driven gear to permit the motor to drive the driven gear via the first drive path. One of the first drive pinion and the driven gear comprises a first sprocket and the other of the first drive pinion and the driven gear comprises a series of rollers arranged to form a ring. Each roller being rotatable about a roller axis at a fixed distance from an axis of rotation of the first drive pinion or driven gear, respectively.

10 Claims, 13 Drawing Sheets

(56) References Cited

U.S. PATENT DOCUMENTS

| | | | | |
|---|---|---|---|---|
| 4,659,039 | A * | 4/1987 | Valdes | B64C 25/405 244/103 S |
| 5,247,847 | A | 9/1993 | Gu | |
| 9,499,260 | B2 * | 11/2016 | Gust | B64C 25/405 |
| 2006/0065779 | A1 | 3/2006 | McCoskey et al. | |
| 2009/0294577 | A1 | 12/2009 | Roques et al. | |
| 2012/0153075 | A1 * | 6/2012 | Wilson | B64C 25/405 244/50 |
| 2013/0026284 | A1 * | 1/2013 | Christensen | B64C 25/405 244/50 |
| 2013/0200210 | A1 * | 8/2013 | Oswald | B64C 25/405 244/50 |
| 2014/0225421 | A1 * | 8/2014 | Oswald | B64C 25/405 301/6.2 |
| 2014/0246539 | A1 * | 9/2014 | Didey | B64C 25/405 244/50 |
| 2015/0314862 | A1 * | 11/2015 | Blanc | B64C 25/405 244/103 S |

FOREIGN PATENT DOCUMENTS

| | | |
|---|---|---|
| CN | 102574581 B | 12/2014 |
| DE | 8806683 U1 | 8/1988 |
| EP | 2527249 A1 | 11/2012 |
| EP | 2551192 A2 | 1/2013 |
| FR | 2954236 A1 | 6/2011 |
| JP | S4933276 U | 3/1974 |
| JP | S6091837 U | 6/1985 |
| JP | H01500211 A | 1/1989 |
| JP | 2010203608 A | 9/2010 |
| WO | 01/46605 A1 | 6/2001 |
| WO | 0146605 A1 | 6/2001 |
| WO | 2005/035358 A2 | 4/2005 |
| WO | 2011/023505 A2 | 3/2011 |
| WO | 2011023505 A2 | 3/2011 |
| WO | 2011/134503 A1 | 11/2011 |
| WO | 2012/171589 A1 | 12/2012 |

OTHER PUBLICATIONS

Written Opinion mailed Oct. 30, 2013 in International Application No. PCT/GB2013/052064, filed Aug. 1, 2013.

UK Search Report mailed dated Nov. 7, 2013 in Great Britain Application No. 1308585.7.

Honda et al., "Research on the Trochoidal Gears (1st Report)—Classification and Basic Formulas of the Trochoidal Gears—", Translation of Journal of the Japan Society for Precision Engineering, 1994, vol. 60, No. 7, p. 949-953.

Honda , "Research on the Trochoidal Gears (2nd Report)—Pressure Angle of Trochoidal Gears and Modification of Tooth Profile—", Translation of Journal of the Japan Society for Precision Engineering, 1995, vol. 61, No. 2, p. 208-212.

International Search Report mailed Dec. 4, 2013 in International Application No. PCT/GB2013/052061, filed Aug. 1, 2013.

Written Opinion mailed Dec. 4, 2013 in International Application No. PCT/GB2013/052061, filed Aug. 1, 2013.

UKIPO Search Report dated Nov. 27, 2012 in GB Application No. 1214198.2.

\* cited by examiner

LANDING GEAR DRIVE SYSTEMS

RELATED APPLICATIONS

The present application is a continuation of U.S. application Ser. No. 14/353,105, filed Apr. 21, 2014, which is a National Phase of International Application Number PCT/GB2013/052061, filed Aug. 1, 2013, and claims priority from Great Britain Application Number 1214198.2, filed Aug. 8, 2012, all of which are incorporated herein by reference in their entirety.

FIELD OF THE INVENTION

The present invention relates to drive systems for rotating one or more wheels of an aircraft landing gear for the purposes of ground taxiing and/or spin-up prior to landing.

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

There is therefore a need for a drive system to power the wheels of an aircraft landing gear during ground taxi operations. There is also a desire to use such a drive system to pre-spin the wheels prior to landing, so that the wheels are already spinning at, or near, their initial landing speed on touch down. Such pre-landing spin-up is perceived to reduce tyre wear on landing, and reduce loads transmitted to the landing gear during landing.

Several autonomous ground taxi systems for both driving the wheels while the aircraft is on the ground and spinning them up prior to landing have been proposed in recent years. An example is disclosed in US2006/0065779, which proposes a powered nose aircraft wheel system in which a clutch is used to switch between a mode in which the wheel can spin freely and a mode in which the wheel can be driven by an electric motor. The clutch can also operate to enable the motor to pre-spin the wheel prior to landing.

Such prior art systems are typically limited to nose landing gears because they take up too much space to be able to be integrated into a main landing gear in which much of the space around the wheels is taken up by braking systems. However, nose landing gears only support a small fraction of the vertical loads supported by the landing gear as a whole during ground taxi operations (approximately 5% of the aircraft weight). There may therefore be insufficient traction between a driven nose landing gear wheel and the ground to enable reliable aircraft ground taxiing. This is a particular concern when the aircraft centre of gravity is towards its aft limit and when the ground surface is slippery.

A prior art arrangement which is not restricted to nose landing gears is described in WO2011/023505. The disclosed system uses an actuator to move a driven toothed pinion gear in and out of driving engagement with a toothed ring gear on the wheel. This system is limited to ground taxi operations.

SUMMARY OF THE INVENTION

A first aspect of the invention provides a drive system for rotating a wheel of an aircraft landing gear, the drive system including a motor operable to rotate a first drive pinion via a first drive path, and a driven gear adapted to be fixed to the wheel, wherein the drive system has a first configuration in which the first drive pinion is capable of meshing with (i.e. capable of driving engagement with) the driven gear to permit the motor to drive the driven gear via the first drive path, and wherein one of the first drive pinion and the driven gear comprises a first sprocket and the other of the first drive pinion and the driven gear comprises a series of rollers arranged to form a ring, each roller being rotatable about a roller axis at a fixed distance from (and substantially parallel to) an axis of rotation of the first drive pinion or driven gear, respectively.

A key advantage of achieving the motor-wheel connection via a sprocket and series of rollers arranged in a ring is that such a mechanism is inherently robust and tolerant of environmental contamination. Thus, it may not be necessary to enclose the drive system within a casing to prevent ingress of debris and other contaminants. In contrast, drive system arrangements employing meshing toothed gears, such as that disclosed in WO2011/023505, must be suitably protected from contaminants, the required protective casing adding both weight and expense, and making routine inspection difficult.

Another advantage of the sprocket-roller arrangement is that it is more tolerant of wheel deformation and misalignment between pinion and driven gear than meshing toothed gear arrangements. Landing gear wheels are subject to high loads and consequential deformation during ground taxiing, and a driven gear fixed to the wheel will inevitably deform in response to such wheel deformation. Meshing toothed gears are intolerant of such deformation and a typical toothed rim gear may need to be isolated from the wheel via bearings, a flexible interface, or similar. In contrast, the sprocket and roller arrangement of the present invention is able to tolerate the deformation without such modification.

In some embodiments the series of rollers may be provided by a roller gear. Thus, each of the series of rollers may be rotatable about a pin, the pins optionally being supported by an annular support member, or between two annular support members.

Such an arrangement has the advantage of being lightweight and having high structural strength. The main failure mode of the rollers is via shear failure of the pins; by mounting each roller directly on its respective pin, with no intermediate sleeve, bush or other part, the diameter of the pin can be maximised to maximise shear strength.

In other embodiments the series of rollers may be provided by a roller chain (also known as an attachment chain, or attachment roller chain) extending around an outer circumference of a support member and being fixed thereto. This arrangement may be less expensive to implement than the roller gear arrangement discussed above. Roller chains are typically utilised so that they extend around one or more sprocket wheels so that the chain is movable relative to those sprocket wheels. By arranging the roller chain so that it is fixed to the support member the roller chain is not required to flex (i.e. there is no relative movement between neighbouring links) and thus the chain is subject to less wear. This in turn leads to a longer useful life of the chain and reduced maintenance costs. Moreover, the roller chain is less likely to become detached from the support member in the event of a failure. However, a small risk of chain detachment remains, making roller chain embodiments potentially less preferred than roller gear embodiments. In roller chain embodiments the first sprocket preferably comprises a pin gear sprocket.

The driven gear preferably has a larger diameter than the drive pinion. This arrangement provides for a torque-magnifying gear ratio and an efficient use of space.

The first drive pinion preferably comprises the first sprocket and the driven gear preferably comprises the series of rollers. This arrangement serves to maximise the number of rollers, and therefore serves to minimise the wear per roller and thus to prolong the life of the driven gear. Moreover, this arrangement provides for easier maintenance since it is likely that the sprocket will succumb to wear more quickly than the series of rollers, and the drive pinion is easier to replace than the driven gear.

The drive system is preferably switchable between the first configuration and a third configuration in which the first drive pinion is not capable of meshing with the driven gear. Thus, the drive system can be employed for ground taxiing when in the first configuration, and for take-off, landing, or other operations in which free rotation of the wheel is important, when in the third configuration. Alternatively, a clutch may be provided between the first drive pinion and the motor.

In some embodiments the drive system includes a second drive pinion and the motor is operable to rotate the second drive pinion via a second drive path, wherein the drive system is switchable between the first configuration and a second configuration in which the second drive pinion is capable of meshing with the driven gear to permit the motor to drive the driven gear via the second drive path, wherein one of the second drive pinion and the driven gear comprises a second sprocket and the other of the second drive pinion and the driven gear comprises the series of rollers, and wherein the first drive path has a higher gearing ratio than the second drive path.

The higher gear ratio of the first drive path provides for a slower rotational speed of the wheel during driving of the driven gear in the first configuration, whereas the lower gear ratio of the second drive path provides for a higher rotational speed of the wheel during driving of the driven gear in the second configuration. Thus, such embodiments enable the drive system to be used for low speed, high torque ground taxiing operations when in the first configuration and for high speed, low torque pre-landing spin-up operations when in the second configuration.

Preferably, the second drive pinion comprises the second sprocket and the driven gear comprises the series of rollers. This arrangement serves to maximise the number of rollers, and therefore serves to minimise the wear per roller and thus to prolong the life of the driven gear. Moreover, this arrangement provides for easier maintenance since it is likely that the sprocket will succumb to wear more quickly than the series of rollers, and the drive pinion is easier to replace than the driven gear.

The drive system is preferably switchable between the first and second configurations and a third configuration in which neither the first nor second drive pinions are capable of meshing with the driven gear. Thus, the drive system can be used for ground taxiing in the first configuration, for pre-landing spin-up in the second configuration, and for operations in which free rotation of the wheel is necessary, such as take-off, in the third configuration.

The present invention also provides an aircraft landing gear having a wheel and a drive system according to the first aspect, wherein the driven gear of the drive system is fixed to the wheel.

A second aspect of the present invention provides a drive system for rotating a wheel of an aircraft landing gear, including a motor, a first drive pinion rotatable by the motor via a first drive path, a second drive pinion rotatable by the motor via a second drive path, and a driven gear adapted to be fixed to the wheel, wherein the drive system is switchable between: a first configuration in which the first drive pinion is capable of meshing with the driven gear to permit the motor to drive the driven gear via the first drive path; and a second configuration in which the second drive pinion is capable of meshing with the driven gear to permit the motor to drive the driven gear via the second drive path, and wherein the first drive path has a higher gearing ratio than the second drive path.

This arrangement enables a single drive system to be used for both ground taxiing operations and pre-landing spin-up operations. The higher gear ratio of the first drive path enables the first configuration to provide a low speed, high torque output suitable for ground taxiing, while the lower gear ratio of the second drive path enables the second configuration to provide a high speed, low torque output suitable for pre-landing spin-up of the wheel.

Preferably, the drive system is switchable between the first and second configurations and a third configuration in which neither the first drive pinion nor the second drive pinion is capable of meshing with the driven gear. Thus, the third configuration can be employed when it is necessary for the wheel to be able to freely rotate, e.g. during take-off.

To achieve the switching between the first and second configurations, the first and second drive pinions may be movable relative to the driven gear such that it is not possible for the first and second pinions to both mesh with the driven gear at the same time. To achieve this arrangement, the drive system may be pivotable about a pivot point between respective rotational axes of the first and second drive pinions to switch between the first and second configurations, and optionally the third configuration.

The drive system may include a linear actuator (or rotary actuator) arranged to move the drive system between the first and second configurations, and optionally the third configuration. The linear actuator may be position-controlled and/or torque-controlled. Torque (or current) control may be used to ensure consistent engagement between the first/second drive pinions and the driven gear in the first and second configurations, while position control may be used to ensure complete disengagement between the drive pinions and the driven gear in the third configuration.

The first drive pinion preferably comprises a first sprocket, the second drive pinion preferably comprises a second sprocket, and the driven gear preferably comprises a series of rollers arranged to form a ring, each roller being rotatable about a roller axis at a fixed distance from an axis of rotation of the driven gear.

An advantage of the sprocket-roller arrangement is that it is more tolerant of wheel deformation than meshing toothed gear arrangements. Landing gear wheels are subject to high loads and consequential deformation during ground taxiing, and a driven gear fixed to the wheel will inevitably deform in response to such wheel deformation. Meshing toothed gears are intolerant of such deformation and a typical toothed rim gear may need to be isolated from the wheel via bearings, a flexible interface, or similar. In contrast, the sprocket and roller arrangement of the present invention is able to tolerate the deformation without such modification. Providing the sprocket as the drive pinion and the series of rollers as the driven gear serves to maximise the number of rollers, and therefore serves to minimise the wear per roller and thus to prolong the life of the driven gear. Moreover, this arrangement provides for easier maintenance since it is likely that the sprocket will succumb to wear more quickly than the series of rollers, and the drive pinion is easier to replace than the driven gear.

In some embodiments the series of rollers may be provided by a roller gear. Thus, each of the series of rollers may be rotatable about a pin, the pins being rigidly held between two annular support members. Such an arrangement has the advantage of being lightweight and having high structural strength. The main failure mode of the rollers is via shear failure of the pins; by mounting each roller directly on its respective pin, with no intermediate sleeve, bush or other part, the diameter of the pin can be maximised to maximise shear strength.

The invention also provides an aircraft landing gear having a wheel and a drive system according to the second aspect, wherein the driven gear of the drive system is fixed to the wheel.

Any of the desirable or optional features discussed herein in relation to the first and second aspects of the invention can be applied to either aspect, either individually or in any combination.

BRIEF DESCRIPTION OF THE DRAWINGS

Embodiments of the invention will now be described with reference to the accompanying drawings, in which:

FIGS. 7 A-C show side views of selected components of the drive system of FIG. 1 with an alternative driven gear, the drive system being shown in a ground taxi configuration (A), neutral configuration (C), and spin-up configuration (B);

FIGS. 8 A & B show isometric views of alternative driven gears of the drive system of FIG. 1;

FIGS. 14 A-C show isometric views of alternative drive pinions for the drive systems of the first or second embodiments;

FIGS. 15 A-C show isometric views of alternative driven gears for the drive systems of the first or second embodiments; and FIGS. 16 A-C show schematic side views of an alternative actuation system for the drive systems of the first or second embodiments.

DETAILED DESCRIPTION OF EMBODIMENT(S)

A first embodiment of the invention is shown in FIGS. 1 to 8. In the illustrated embodiment the landing gear has two wheels, but the principles of the embodiment may be applied to landing gear with four or more wheels. The embodiment shows a main landing gear (i.e. a landing gear attached to wing structure or fuselage structure in the region of the wings), since the weight supported by the main landing gear is considered to provide the best traction between the wheels and the ground to enable reliable aircraft ground taxiing. However, the drive system of the present invention may alternatively be applied to a nose landing gear (i.e. a steerable landing gear towards the nose of the aircraft).

Figure 1:
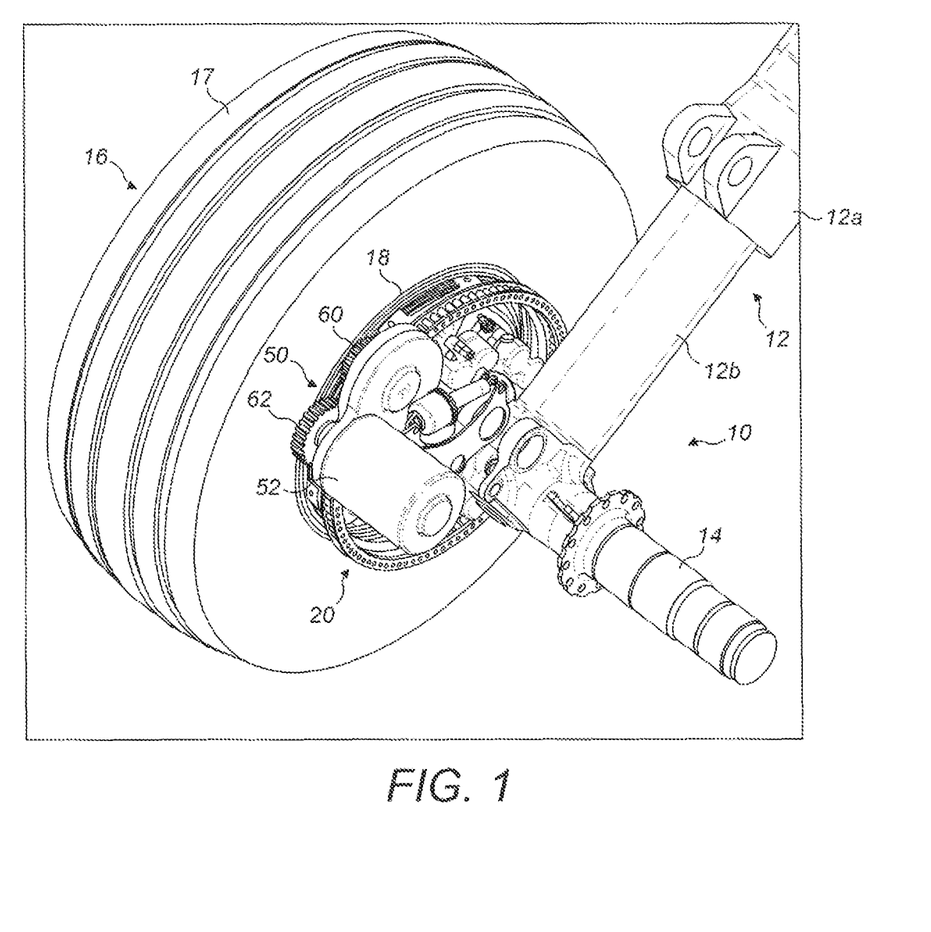
FIG. 1 shows an isometric view of a drive system according to a first embodiment.
Figure 2:
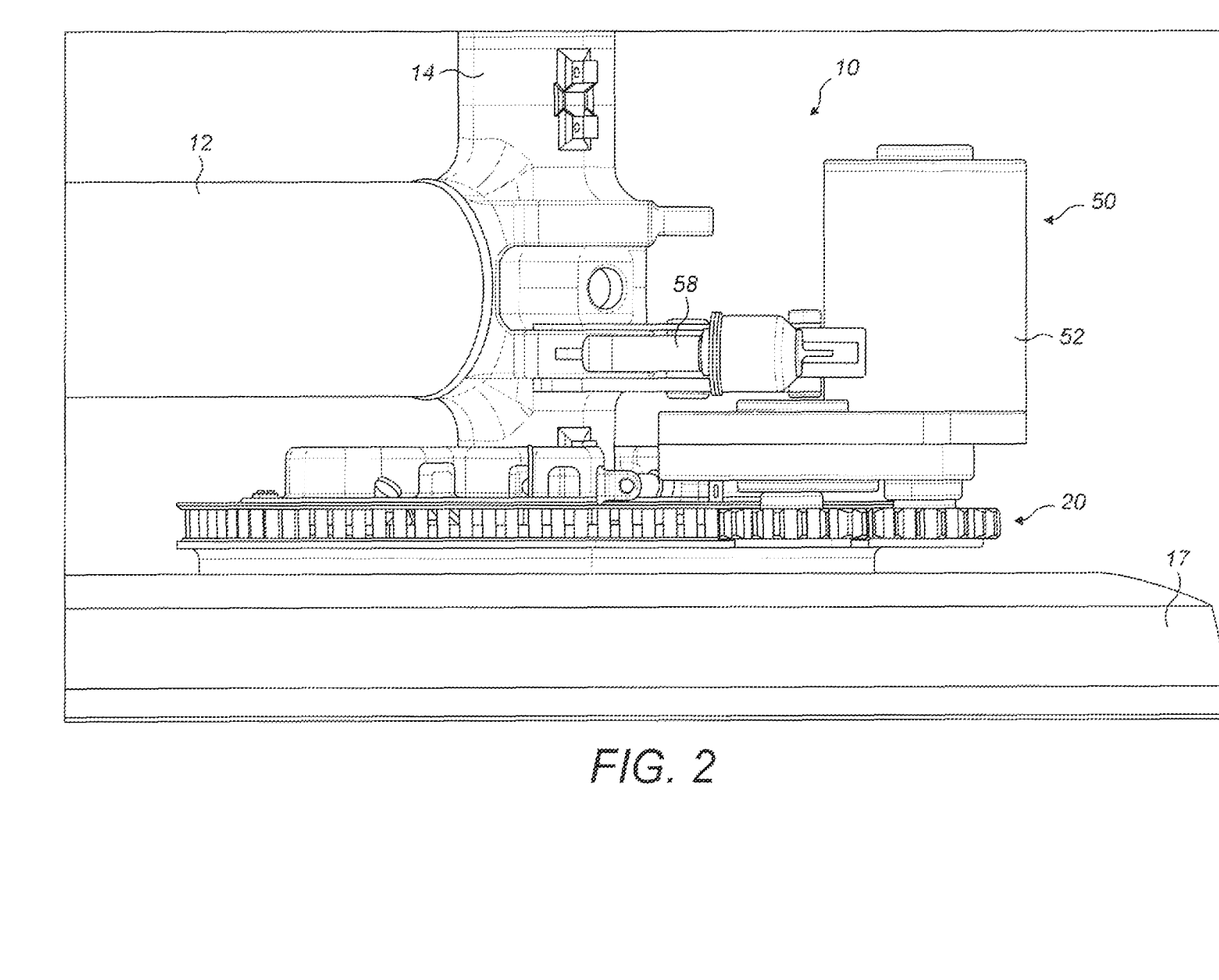
FIG. 2 shows a plan view of the drive system of FIG. 1.

The landing gear 10 includes a telescopic shock-absorbing main leg 12, including an upper telescopic part 12a (main fitting) and a lower telescopic part 12b (slider). The upper telescopic part 12a is attached to the aircraft fuselage or wing (not shown) by its upper end (not shown). The lower telescopic part 12b supports an axle 14 carrying a pair of wheels 16, one on either side of the main leg, (only one wheel 16 is shown in FIGS. 1 and 2, for clarity. The wheels 16 are arranged to rotate about the axle 14 to enable ground movement of the aircraft, such as taxiing or landing.

Each wheel 16 comprises a tyre 17 supported by a hub 18 (also known as a rim). A driven gear 20 is attached to the hub 18 so as to be rotatable with the wheel 16, the driven gear 20 comprising a roller gear 34 formed by two rigid annular rings 35 connected together by a series of rollers 36 extending around the rings to form a continuous track. The rollers 36 are each rotatable about a pin (not shown) which extends between the annular rings 35 to form a rigid connection between the annular rings 35. One of the annular rings 35 comprises a plurality of connection extension tabs 37 which provide a rigid connection to the hub 18.

Figure 7A:
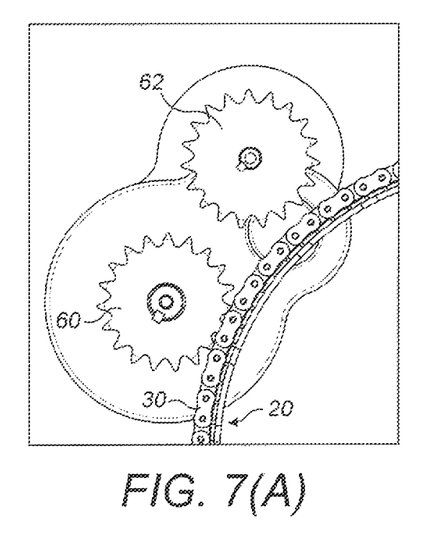
Figure 7B:
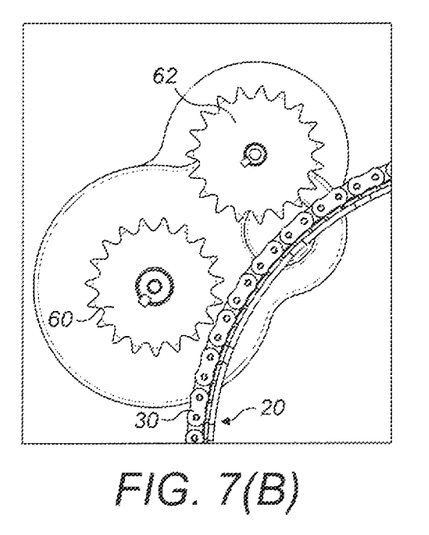
Figure 7C:
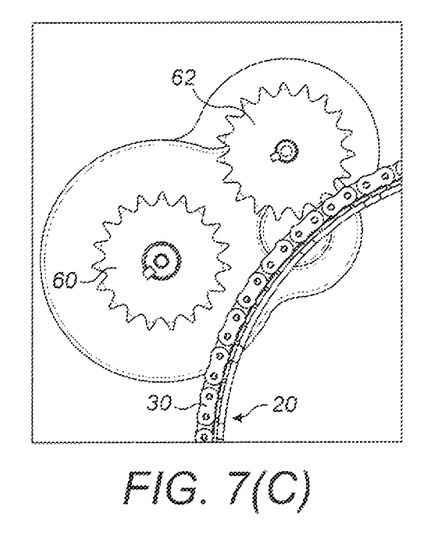
Figure 8A:
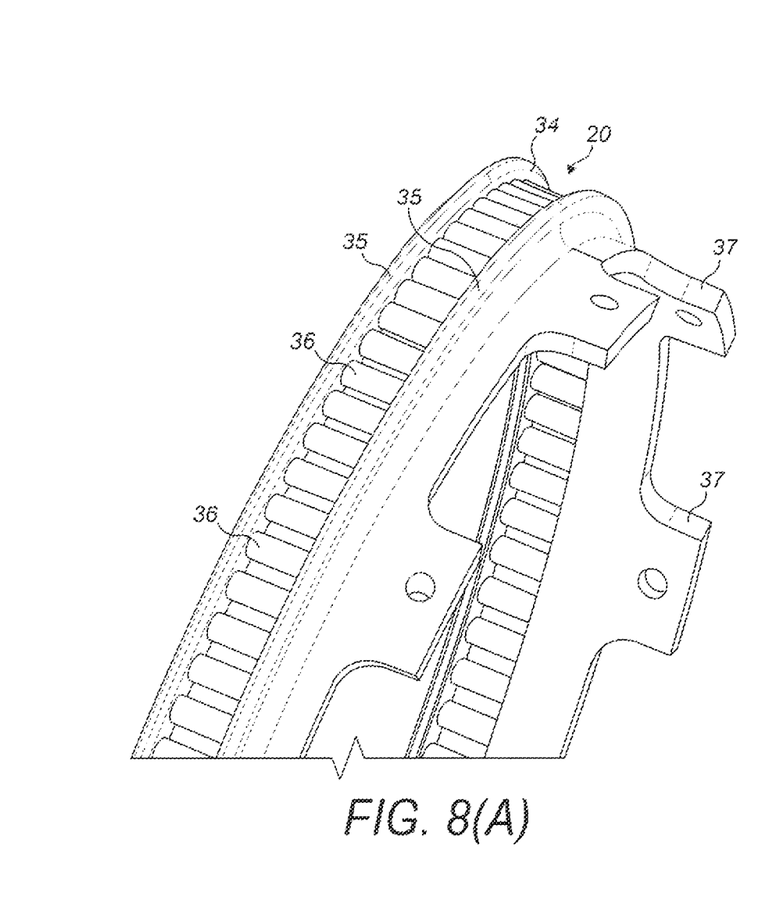

FIGS. 7A-C and 8B illustrate an alternative arrangement for the driven gear 20 in which a roller chain 30 extends around a rigid annular extension ring 21. The extension ring 21 (or drum) is rigidly attached to the hub 18 via a plurality of extension tabs 22 so that it extends from an outer circumference of the hub 18 towards the leg 12. A roller chain 30 is fixed around the outer circumference of the extension ring 21 so that it forms a continuous track around the ring 21. FIG. 8A shows a detailed view of the extension ring 21 and roller chain 30 (also known as an attachment chain, or attachment roller chain), in which it can be seen that the roller chain 30 comprises multiple interlinked chain elements 31, each comprising a sub-assembly of two rollers 32 mounted on parallel axes. Each roller 32 is rotatable about a bush (not shown) which is itself mounted on a pin (not shown). Each chain element 31 is pivotally mounted to its neighbouring element by a pair of link elements 33 so that the rollers 32 are arranged to form a continuous track, or series, and each element 31 is thus designed to be able to rotate relative to its neighbour. Of course, since the roller chain 30 is fixed to the extension ring 21, the chain elements 31 are prevented from pivoting relative to one another.

The two possible arrangements for the driven gear 20 have in common that the rollers 32, 36 are each rotatable about a roller axis (not shown) which remains at a fixed distance from the axis of rotation of the wheel 16 (which corresponds to the axis of rotation of the extension ring 21 or annular rings 35). The roller gear arrangement of FIG. 8A may be preferred because it is possible to have a larger diameter pin for each roller 36 of the roller gear 34 than for each roller 32 of the chain 30, so that the shear strength of each roller-pin assembly can be much higher in the roller gear 34 than in the chain 30. This is because there is no requirement for an additional bush between the pin and roller 36 of the roller gear 34, since the pin itself acts as a bush.

A drive system 50 comprises a motor 52 which rotates an input shaft 54 which itself rotates first 60 and second 62 output sprockets via a gearbox 70. The first 60 and second 62 sprockets are each wheel-type sprockets with radially-extending teeth which can interlock with the rollers 32 of the roller chain 30 (or rollers 36 of roller gear 34). Although the figures only show features of the drive system 50 for driving one of the wheels 16, it is intended that these features be mirrored for the other wheel 16. That is, it is intended that one drive system 50 will be provided for each wheel 16. For a landing gear 10 with four or more wheels 16, a drive system 50 may be provided for each of the wheels 16, or for only two of them. In embodiments in which only two of the wheels 16 are provided with drive systems 50, it may be necessary to provide further motors (not shown) to achieve pre-landing spin-up of the un-driven wheels, with ground taxiing being accomplished by the two drive systems 50. In other embodiments it may be possible to have one motor 52 shared between two drive systems 50. That is, the motor 52 may be arranged to rotate the input shaft 54 of each drive system.

Figure 3:
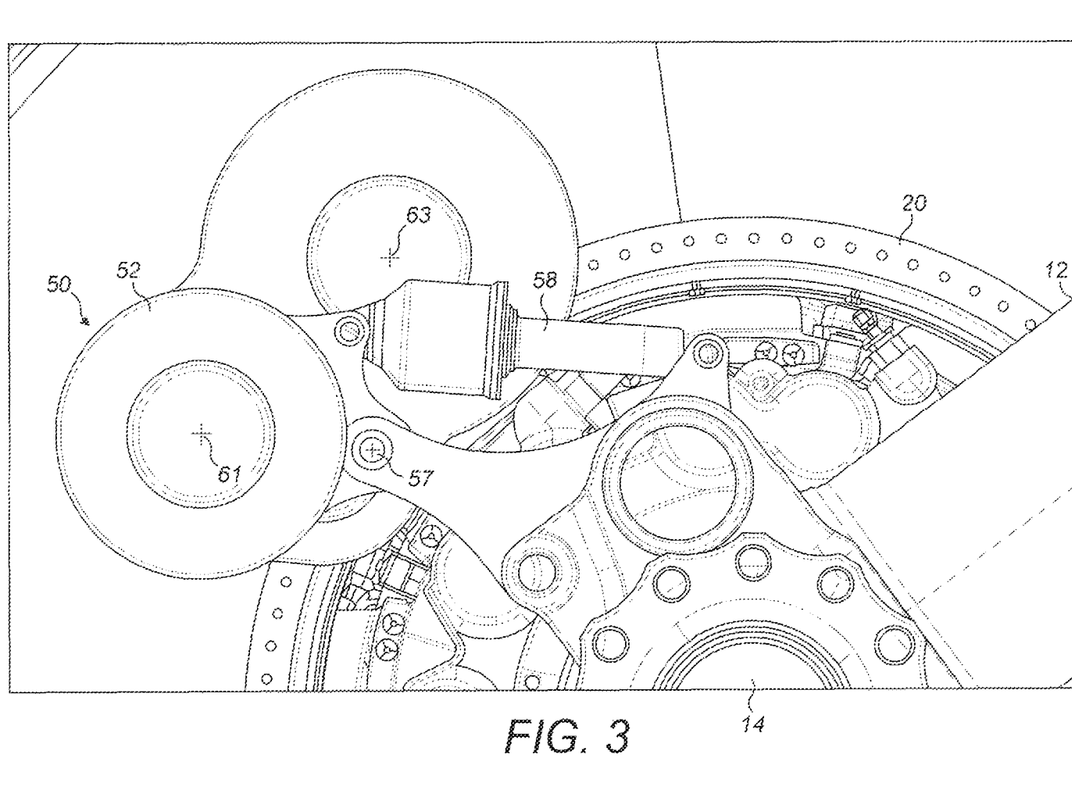
FIG. 3 shows a side view of the drive system of FIG. 1.
Figure 4:
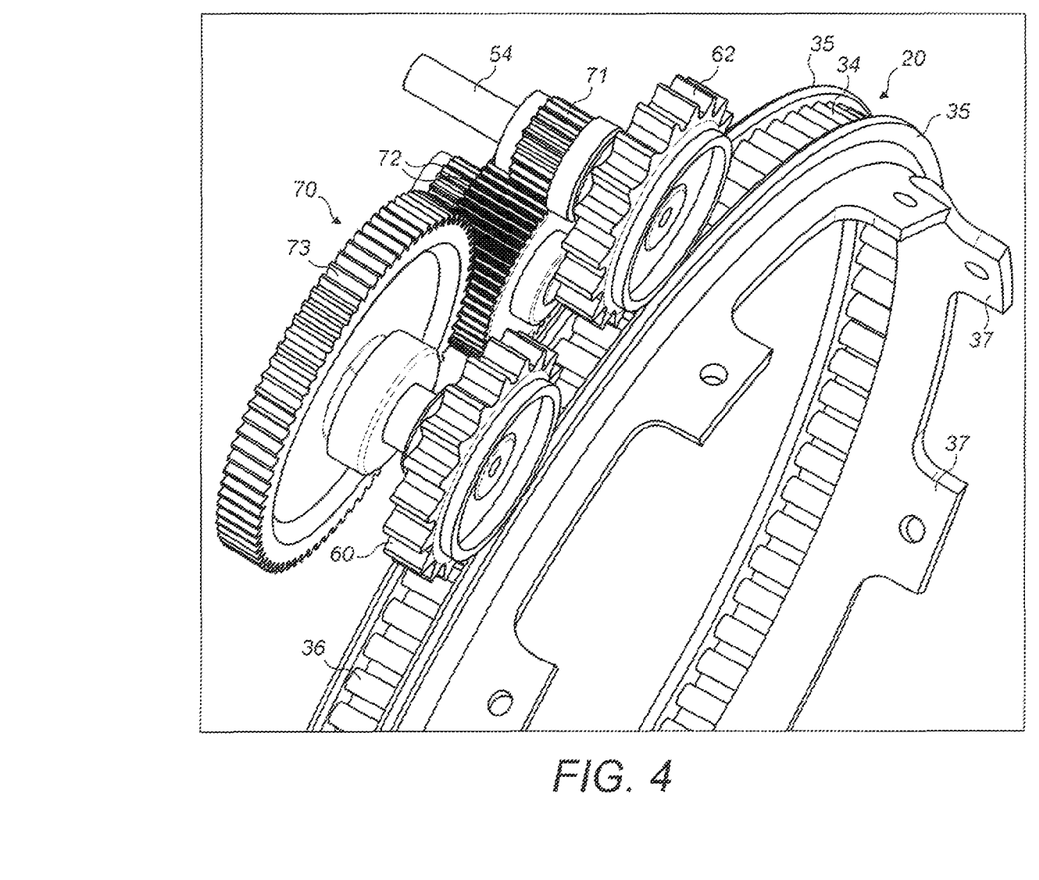
FIG. 4 shows an isometric view of selected components of the drive system of FIG. 1.
Figure 5:
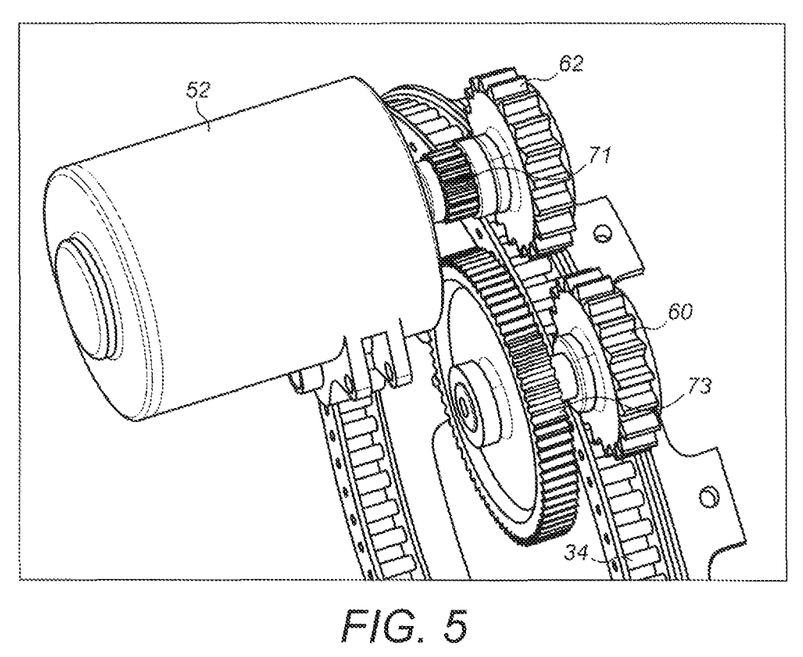
FIG. 5 shows another isometric view of selected components of the drive system of FIG. 1.
Figure 6:
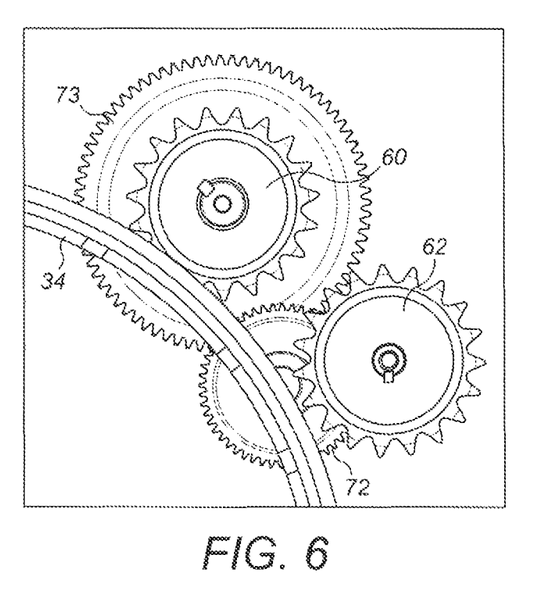
FIG. 6 shows a side view of selected components of the drive system of FIG. 1.

The drive system 50 is supported by a bracket 56 which is rigidly connected to the axle 14 of the landing gear and pivotally connected to the motor 52 about a pivot axis 57 which is generally located between respective rotational axes 61, 63 of the sprockets 60, 62 (see FIG. 3). The drive system 50 may alternatively be mounted on the upper telescopic part 12a (main fitting) or lower telescopic part 12b (slider). A linear actuator 58, such as a direct-drive roller-screw electro-mechanical linear actuator, extends between the bracket 56 (at an end nearest the axle 14) and the motor 52. Thus, linear movement of the actuator 58 is translated to rotational movement of the drive system 50. Because of the location of the pivot axis 57 between the axes 61, 63 of the sprockets 60, 62, the drive system 50 can be rotated between a position in which only the first sprocket 60 engages the roller chain 30 (FIG. 7A) and a position in which only the second sprocket 62 engages the roller chain 30 (FIG. 7C). In a position between these two extremes neither sprocket 60, 62 engages the roller chain 30 (FIG. 7B). This pivoting arrangement ensures that it is not possible for both the first sprocket 60 and second sprocket 62 to engage the roller chain 30 at the same time.

The gearbox 70 comprises first 71, second 72, and third 72 cooperating toothed gears. The first gear 71 is fixed to the input shaft 54 so that it rotates with that shaft. The third gear 73 is connected to the first sprocket 60, and the second gear 72 interconnects the first 71 and third 73 gears. Thus, the first, second and third gears provide a first drive path between the input shaft 54 and the first sprocket 60. In the illustrated embodiment the gearing ratio of the second drive path is 40:1. The input shaft 54 is directly connected to the second sprocket 62 to provide a second drive path which effectively bypasses the gearbox. In the illustrated embodiment the gearing ratio of the second drive path is 5:1, i.e. much lower than that of the first drive path. Thus, the drive system 50 is arranged to have three configurations: a low speed, high torque taxiing configuration in which the motor 52 drives the wheel 16 via the first drive path and first sprocket 60 (FIG. 7A); a high speed, low torque spin-up configuration in which the motor 52 drives the wheel 16 via the second drive path and second sprocket 62 (FIG. 7c); and a neutral (disconnected) configuration in which neither the first sprocket 60 nor the second sprocket 62 engages the roller chain (FIG. 7B). The taxiing configuration is suitable for accelerating the wheel 16 to speeds of 175 rpm (equivalent to 20 knots) during ground taxing, while the spin-up configuration is suitable for accelerating the wheel 16 to rotational speeds of 1400 rpm (equivalent to 160 knots ground speed) prior to touch down on landing.

The motor 52, gearbox 70 and first and second sprockets 60, 62 are encased within a housing to protect the components therein from environmental contamination by debris etc which may cause malfunction.

In the taxing configuration the linear actuator 58 (which may be back-drivable) may be torque controlled (or current controlled) to apply a substantially constant load between the first sprocket 60 and the drive gear 20, thereby allowing for some deformation of the various component parts of the drive system 50 while at the same time preventing unwanted separation. The linear actuator 58 may be similarly controlled in the spin-up configuration, although separation loads will be lower during spin-up than during ground taxiing so this should be reflected in the control logic. In the neutral configuration the linear actuator 58 may be position controlled to achieve the neutral position whereby neither sprocket is engaged with the drive gear 20. An electromechanical brake (not shown), or other similar locking device, may be integrated within the actuator 58 to lock the actuator in the neutral configuration.

A second embodiment of the invention is shown in FIGS. 9 to 12. This embodiment is similar to the first embodiment (like parts being labelled with the same reference numerals for convenience), with the only difference being in the drive system 50. That is, the second embodiment includes only a first sprocket 60 and no second sprocket 62. Thus, there is only one sprocket 60 able to mesh with the drive gear 20 to drive the wheel 16, and only one drive path between the motor 52 and the first sprocket 60. In the drawings the drive gear 20 is shown as a roller gear 34 as described above in relation to FIG. 8A, but the chain 30 and extension ring 21 arrangement of FIG. 8B would be a suitable alternative.

The actuator 58 is arranged to rotate the drive system 50 between a position in which the first sprocket 60 engages the roller chain 30 (as shown in FIGS. 9 to 12) and a position in which the first sprocket 60 is not able to engage the roller chain 30. In this way, the drive system 50 has two possible configurations: a low speed, high torque taxiing configuration in which the motor 52 drives the wheel 16 via the first drive path and first sprocket 60; and a neutral (disconnected) configuration in which neither the first sprocket 60 nor the second sprocket 62 engages the roller chain.

Thus, the drive system 50 of the first embodiment is suitable for only ground taxiing operations (or could be modified to be suitable for only pre-landing spin-up operations), while the drive system of the second embodiment is suitable for both ground taxiing and pre-landing spin-up operations.

Figure 13:
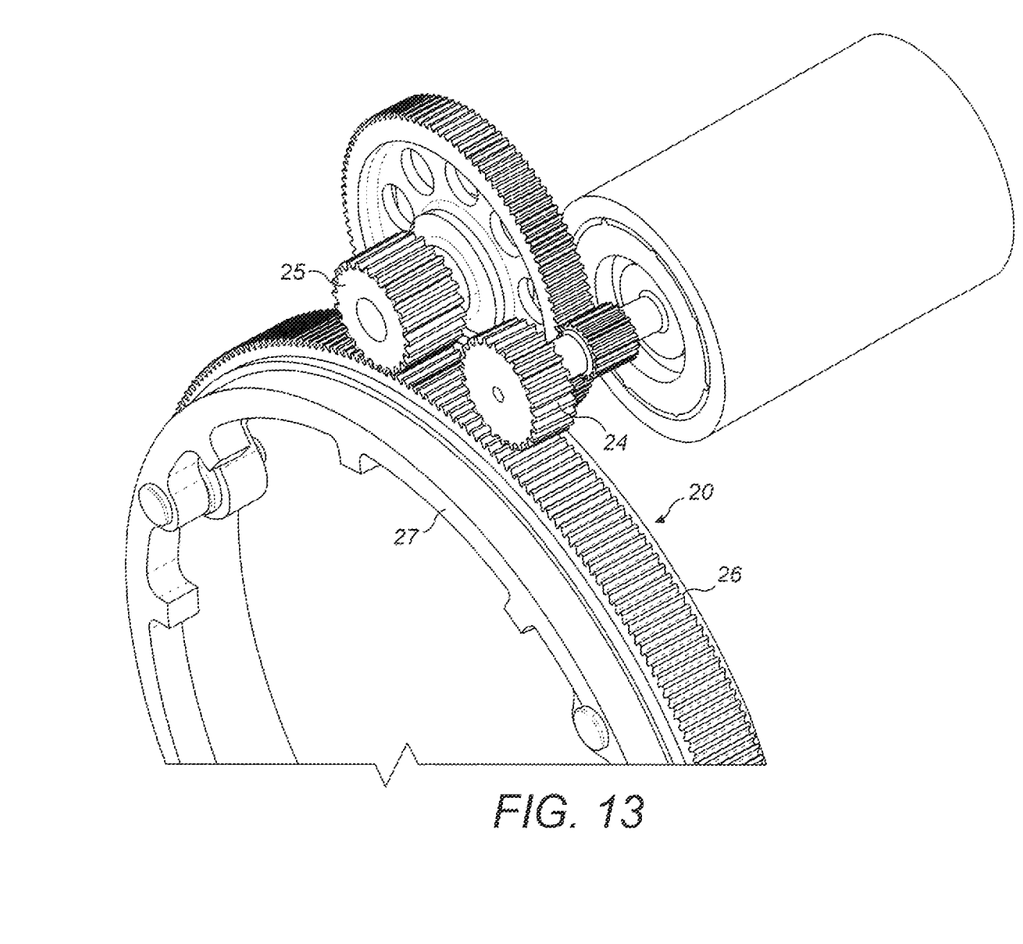
FIG. 13 shows a detail view of an alternative drive pinion and driven gear suitable for the first and second embodiments.

In both the first and second embodiments one or each of the first sprocket 60 and second sprocket 62 can be replaced with a spur gear (not shown) or other type of toothed gear, and the driven gear 20 can be replaced with a ring gear (not shown) or other type of toothed gear. Such an arrangement is illustrated in FIG. 13, which shows a first spur gear 24 in place of the first sprocket 60 and a second spur gear 25 in place of the second sprocket 62. The first 24 and second 25 spur gears meshing with a ring gear 26 which is fixed to the wheel (not shown) via a flexible interface 27 to provide the driven gear 20. The flexible interface 27 serves to isolate the ring gear 26 from wheel deformation loads. The toothed gears 24, 25, 26 can be arranged to mesh together to achieve the taxiing and/or spin-up configurations in the same way as previously described with respect to the first and second embodiments.

Figure 8B:
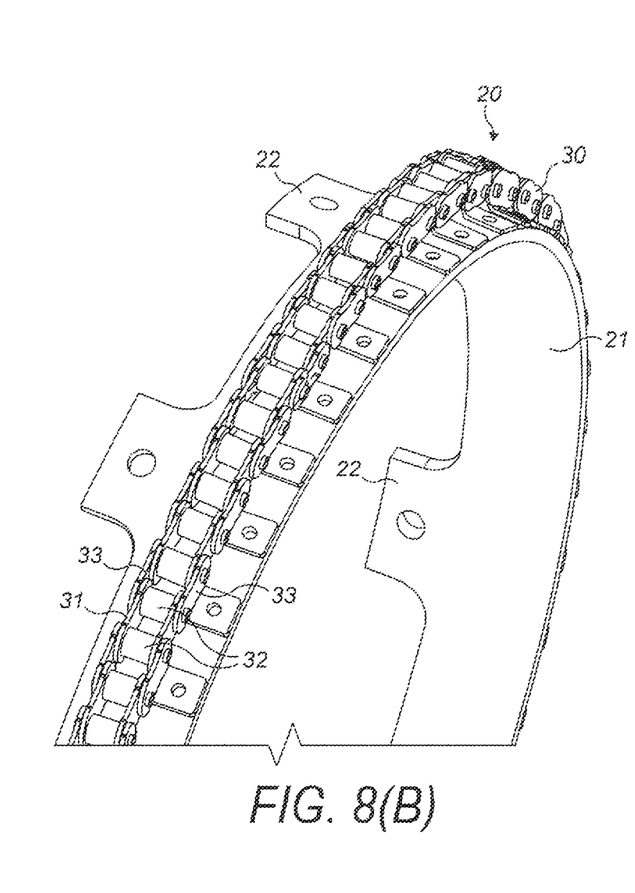
Figure 9:
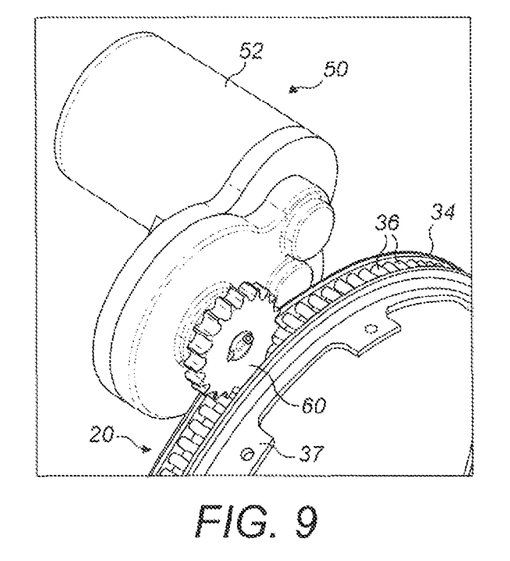
FIG. 9 shows an isometric view of a drive system according to a second embodiment, with some parts omitted for clarity.
Figure 10:
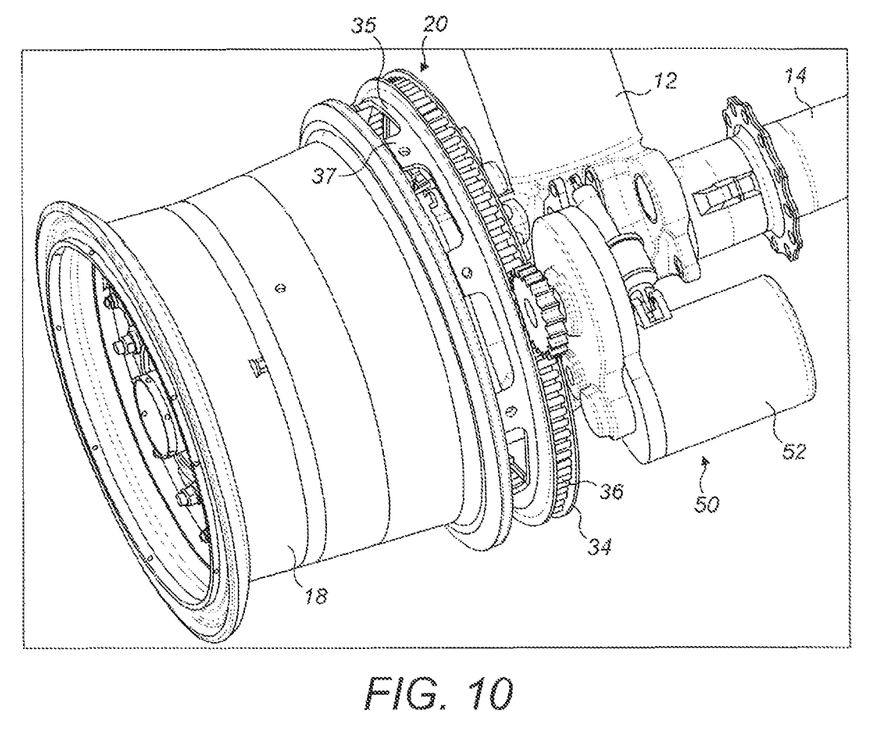
FIG. 10 shows an isometric view of the drive system of FIG. 9.
Figure 11:
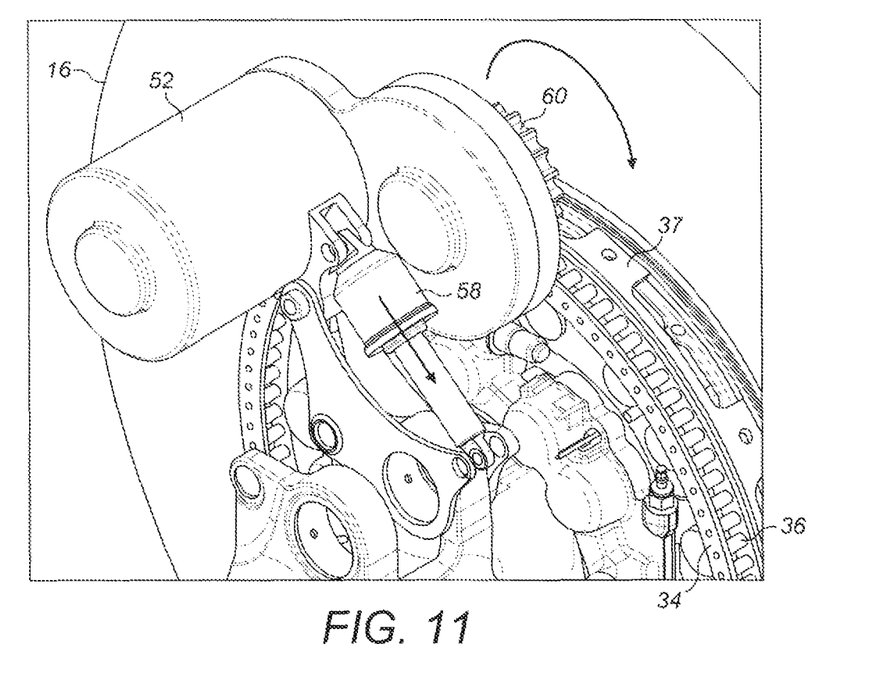
FIG. 11 shows an isometric view of the drive system of FIG. 9.
Figure 12:
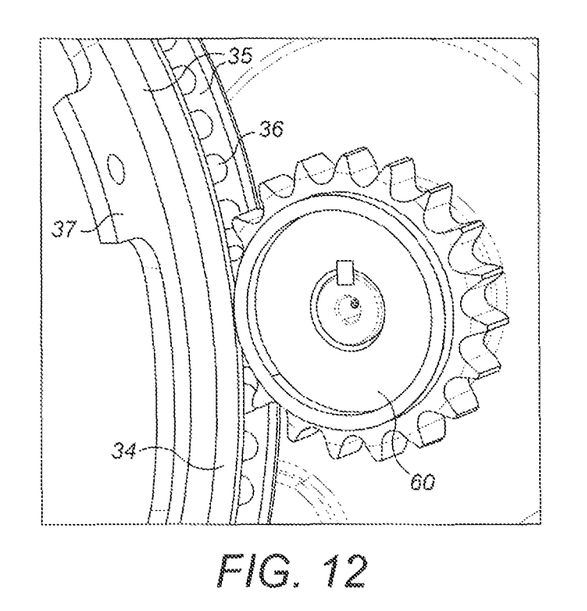
FIG. 12 shows a detail view of the drive system of FIG. 9.
Figure 14A:
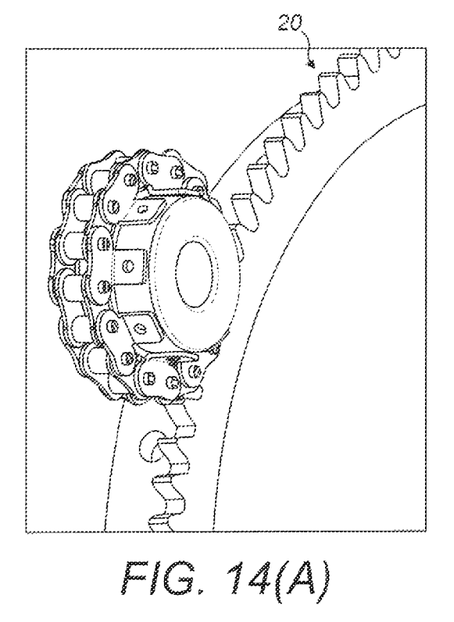
Figure 14B:
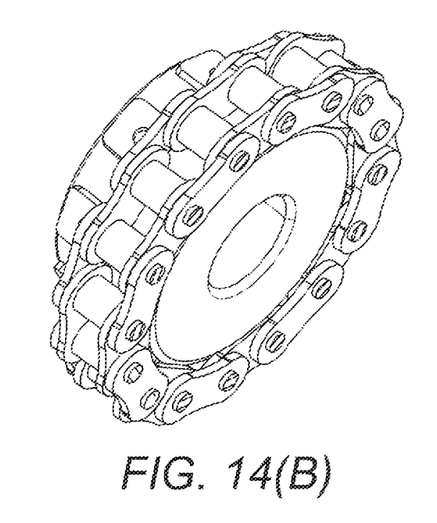
Figure 14C:
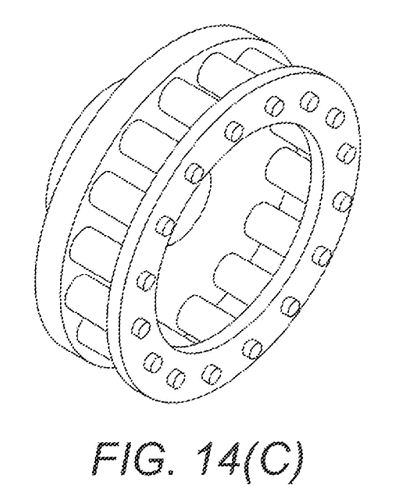

In both the first and second embodiments one or each of the first sprocket 60 and the second sprocket 62 can be replaced with a roller gear similar to that illustrated in FIG. 8b, or a roller chain fixed around a drum similar to that illustrated in FIG. 8a. Such an arrangement is illustrated in FIGS. 14 A & B, which show an embodiment in which the first sprocket (first drive pinion) is replaced by a roller chain (attachment chain) fixed around a drum, and FIG. 14 C, which shows an alternative example of a roller gear suitable as a first drive pinion. In such alternative embodiments the drive gear 20 comprises a sprocket of the type illustrated in the figures for the first and second sprockets, as shown in FIG. 14A. That is, the principle of achieving drive via meshing between a sprocket and roller gear/roller chain can be applied when the driven gear comprises the sprocket and the drive pinion comprises the roller gear/roller chain, and vice versa.

In both the first and second embodiments each of the first and second sprockets 60, 62 may comprise multiple co-axial sprockets, each sprocket being arranged to mesh with one of multiple co-axial rings of rollers comprised in the driven gear 20 in order to increase the load rating of the assembly. For example, in the first embodiment the first and second sprockets 60, 62 may each comprise a pair of co-axial sprockets and the driven gear 20 may comprise a corresponding pair of chains 30, whereby a respective one of the pair of co-axial sprockets is arranged to mesh with a respective one of the chains 30.

Figure 15A:
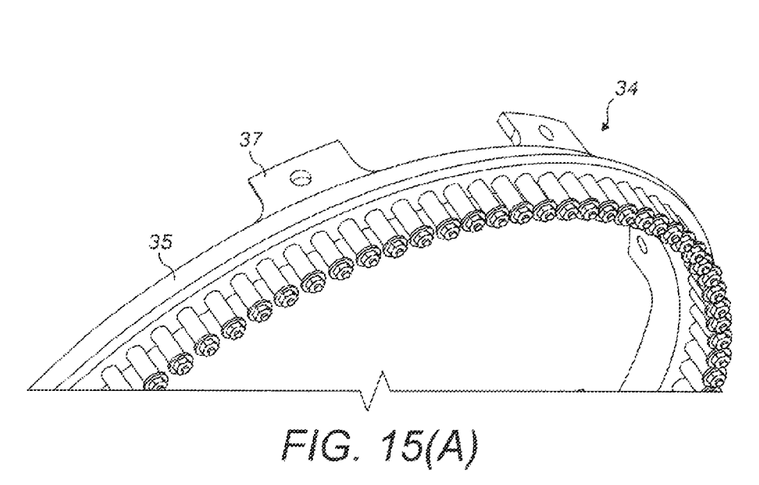
Figure 15B:
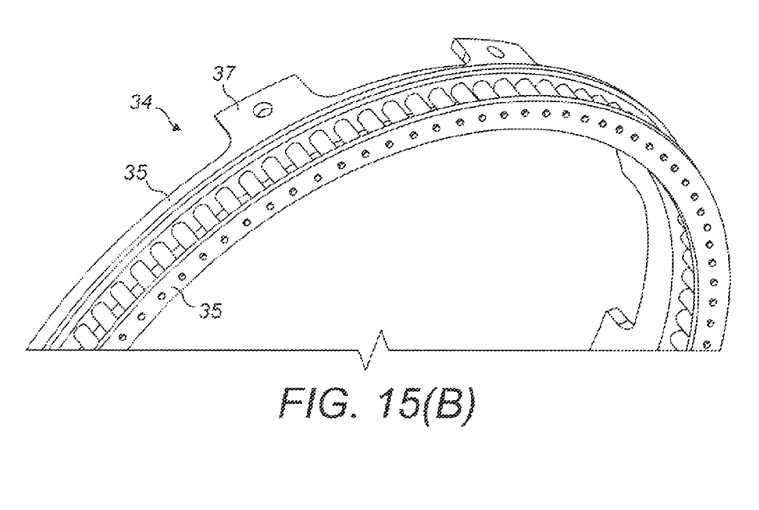
Figure 15C:
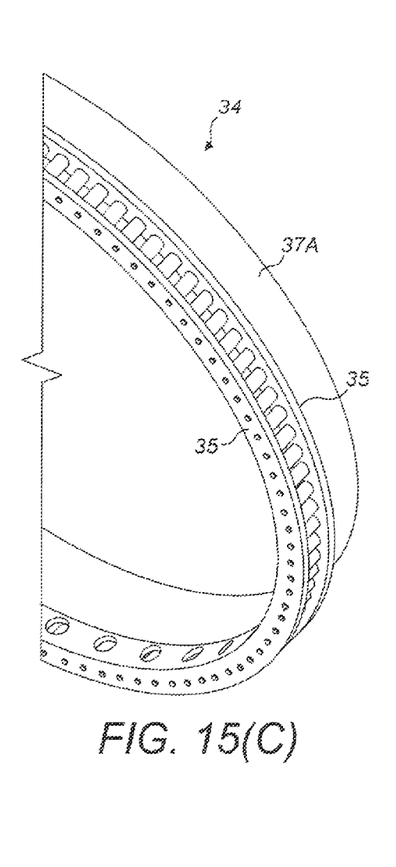

In both the first and second embodiments the roller gear may be constructed in any of a plurality of different ways, including those illustrated in FIGS. 15 A, B & C. Thus, the roller gear may include rollers 36 which are each rotatable about a pin which is fixed at only one end to a rigid annular ring 35 (FIG. 15A). Alternatively, each pin may be fixed at each end to one of a pair of rigid annular rings 35 (FIGS. 15B & 15C).

The connection extension tabs 37 shown in FIGS. 15A and 15B may be replaced with a continuous extension rim 37A as shown in FIG. 15C, in order to improve the stiffness of the roller gear.

Figure 16A:
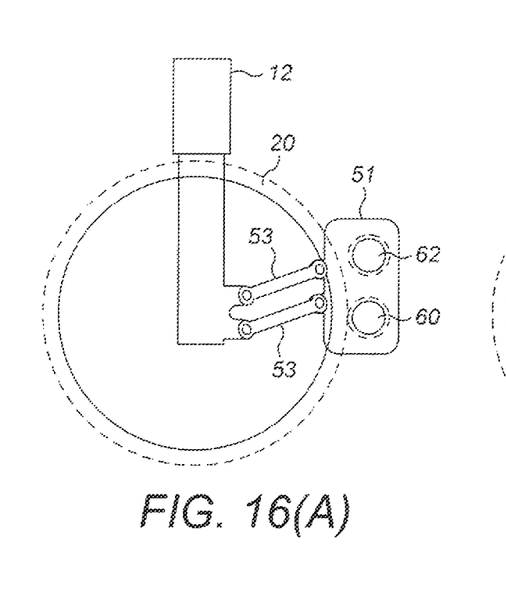
Figure 16B:
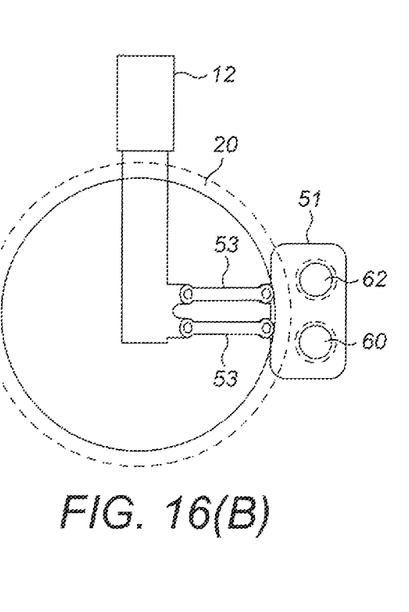
Figure 16C:
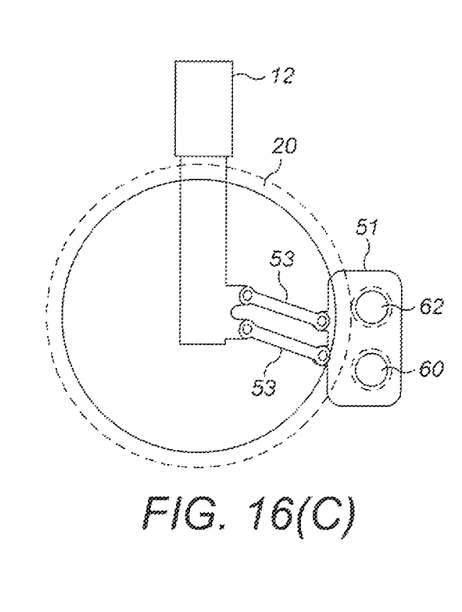

FIGS. 16A-C illustrate an alternative arrangement to the assembly provided by the linear actuator 58 and pivoting bracket 56, described above. In this alternative arrangement the first 60 and second 62 sprockets are both mounted on a common mounting plate 51 which is connected to the landing gear leg 12 by a pair of pivotable arms 53. The arms 53 may be pivotably connected to either the upper telescopic part 12a (main fitting) or the lower telescopic part 12b (slider) of the landing gear 10. The 'parallelogram' arrangement of the arms 53 enables the mounting plate 51 to be translated relative to the driven gear 20 without being subject to any rotation. Thus, the first 60 and second 62 sprockets can be moved between the taxiing configuration (FIG. 16A), the neutral configuration (FIG. 16B), and the spin-up configuration (FIG. 16C).

Although the invention has been described above with reference to one or more preferred embodiments, it will be appreciated that various changes or modifications may be made without departing from the scope of the invention as defined in the appended claims.

The invention claimed is:

1. A drive system for rotating a wheel of an aircraft landing gear, the drive system including a motor operable to rotate a first drive pinion via a first drive path, and a driven gear adapted to be fixed to the wheel, wherein the drive system has a first configuration in which the first drive pinion is capable of meshing with the driven gear to permit the motor to drive the driven gear via the first drive path, and wherein the driven gear comprises a series of rollers arranged to form a ring, each roller being rotatable about a roller axis at a fixed distance from an axis of rotation of the first drive pinion or driven gear, respectively.

2. A drive system according to claim 1, wherein the drive system comprises a switching mechanism configured for switching the drive system between the first configuration and a third configuration in which the first drive pinion is not capable of meshing with the driven gear.

3. A drive system according to claim 1, wherein each of the series of rollers is rotatable about a pin, the pins each being fixed at at least one end to an annular support member.

4. A drive system according to claim 2, wherein each of the series of rollers is rotatable about a pin, the pins each being fixed at at least one end to an annular support member.

5. A drive system according to claim 1, wherein the first drive pinion comprises a first sprocket.

6. A drive system according to claim 1, including a second drive pinion, the motor being operable to rotate the second drive pinion via a second drive path, wherein the drive system is switchable between the first configuration and a second configuration in which the second drive pinion is capable of meshing with the driven gear to permit the motor to drive the driven gear via the second drive path, wherein the first drive path has a higher gearing ratio than the second drive path.

7. A drive system according to claim 6, wherein the second drive pinion comprises a second sprocket.

8. A drive system according to claim 7, wherein the drive system is switchable between the first and second configurations and a third configuration in which neither the first nor second drive pinions are capable of meshing with the driven gear.

9. An aircraft landing gear having a wheel and a drive system according to claim 1, wherein the driven gear of the drive system is fixed to the wheel.

10. An aircraft landing gear as claimed in claim 9, wherein the drive system is supported by a bracket which is rigidly connected to an axle, main fitting, or slider part of the landing gear.

* * * * *